Figure 1:
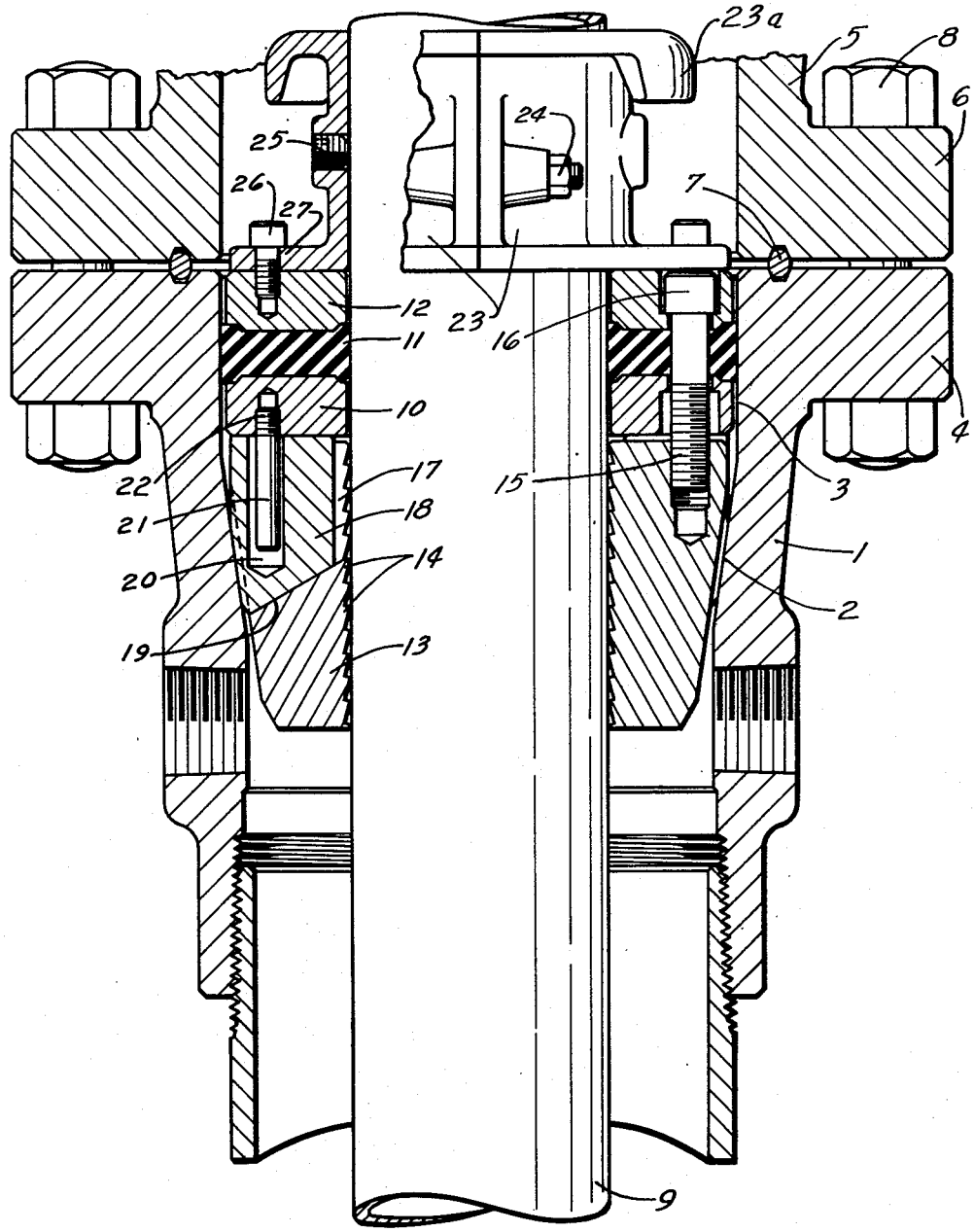

HERBERT ALLEN
INVENTOR.

HERBERT ALLEN
*INVENTOR.*

Patented July 6, 1954

2,683,046

UNITED STATES PATENT OFFICE 2,683,046

PIPE HANGER AND SEAL ASSEMBLY

Herbert Allen, Houston, Tex., assignor to Cameron Iron Works, Inc., Houston, Tex., a corporation of Texas Application March 30, 1950, Serial No. 152,913

17 Claims. (Cl. 285—22)

This invention relates in general to pipe hanging and sealing apparatus and has for its general object the provision of such an apparatus which will become fully and automatically effective upon being lowered into position about a pipe and the weight of the pipe released thereon.

It is often desirable in completing a well to hang and provide a seal about the outside of an inner string of pipe prior to removal of the control equipment, such as blowout preventers and the like, which are customarily employed on a well about the casing or tubing head. Various means have in the past been proposed for performing this function, but such means have either required special types of casing or tubing heads, which, unless the operator had foreseen the necessity for the particular type of hanging and sealing device employed, would probably not be in place on the well, or have required that the pipe be hung at a collar or special section of pipe which would provide a downwardly facing shoulder on the exterior of the pipe. In still other instances, suggestions have involved the provision of a tapered bowl forming part of the mechanism separate from the casing or tubing head, and such a bowl, as will be appreciated, is an expensive item to manufacture.

In those previous devices which have purported to provide seals automatically upon hanging of the pipe, some have provided for the entire weight of the pipe to rest on the seals to expand the same, a situation which in some cases may result in damage to the pipe being hung; and other such devices have relied upon what is customarily known as a lip type seal, which is capable of resisting pressure in one direction only.

It is an object of this invention to provide a device of the type referred to which will not require any special well head equipment other than the hanging and sealing device itself, and will not require any special element to be incorporated in the pipe nor require the pipe to be hung at any specified point.

Another object of this invention is to provide a pipe hanger and seal assembly of the type referred to which may be placed about a pipe to be hung in a tubing head or casing head having a tapered lower portion and a cylindrical upper portion in which the seal affected by such pipe hanger and seal assembly is effective in the cylindrical portion of the casing head or tubing head.

Another object of this invention is to provide a pipe hanger and seal assembly of the type referred to which will automatically provide a compressed-packing type seal when the pipe is hung, in which the pressure on the seal may be increased if desired after the pipe has been hung.

Another object of this invention is to provide a pipe hanger and seal assembly which will automatically provide a compressed-packing type seal when the pipe is hung and which may be thereafter released and the pipe lifted and hung and sealed at a higher position, the hanging and sealing action in the second instance being the same as in the first.

Another object of this invention is to provide for a pipe hanger and seal assembly which is made of a plurality of parts, a means for holding said parts assembled and for guiding them in proper alignment into position to be set.

Another object of this invention is to provide a pipe hanger and seal assembly of the type referred to which may be easily and cheaply manufactured and which will be positive and sure in action.

Other objects and advantages of this invention will become apparent from the following description taken in connection with the accompanying drawings wherein is set forth by way of illustration and example one embodiment of this invention.

Figure 2:
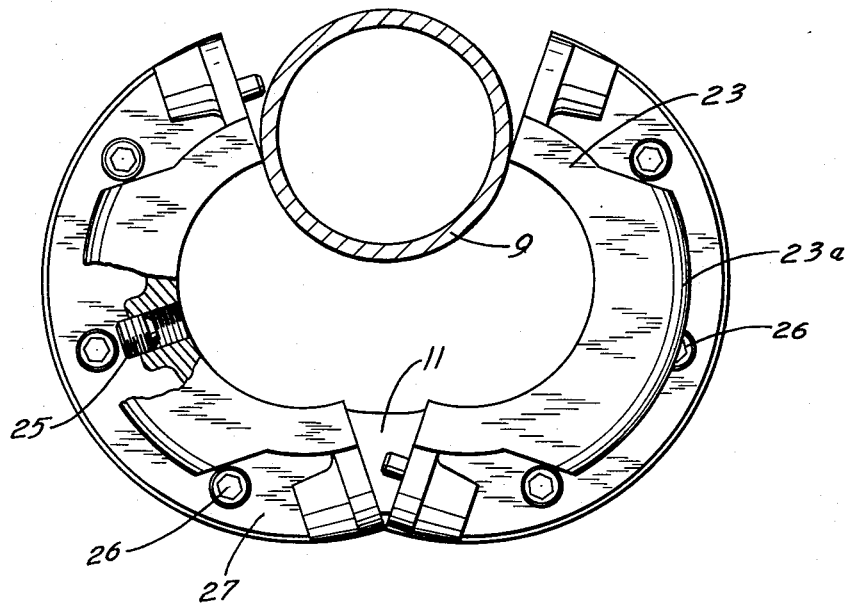

In the drawings:

Figure 1 is a view illustrating in longitudinal cross-section a pipe being hung and a tapered bowl type casing head of ordinary construction in which it is being hung, the pipe hanger and seal assembly being illustrated in longitudinal cross-section, and the parts occupying the position which they would assume upon the pipe hanger and seal assembly reaching its position in the casing head and during the downward travel of the slip segments, which travel takes place as part of the actual hanging of the casing and the formation of the seal;

Figure 2 is a plan view of a pipe hanger and seal assembly such as shown in Figure 1, being placed about a pipe to be hung, the pipe being shown in horizontal cross-section.

Referring now more in detail to the drawings, the numeral 1 indicates a casing head of conventional construction having a tapered zone 2 on its interior, such taper converging in a downward direction, and having a substantially cylindrical zone 3 on its interior above the tapered zone 2. This casing head is provided with a flange 4 extending outwardly from its upper end for the purpose of securing it to a suitable fitting to be connected thereto, the lower portion of such fitting being indicated by the numeral 5 in Figure 1. The fitting 5 may be a blowout preventer, valve, or other suitable connection, and is provided with a flange 6 matching the flange 4 on the casing head. Between these two fittings, the casing head 1, and the fitting 5, there is interposed a customary type seal ring 7 so that when the flanges 4 and 6 are drawn together by bolts 8, the two fittings will be completely sealed to each other.

Located within the casing head 1 and to be hung in such head and sealed thereto is a pipe 9 which may be an inner string of well casing and which may extend upwardly from the casing head through suitable control equipment such as blowout preventers, valves and the like.

The hanging and sealing assembly to which this invention relates is made up of a packing holding ring 10, an annular distortable packing 11, a packing compressing ring 12, and a ring of slip segments 13.

The packing holding ring 10 is illustrated as being located above the slip segments 13 and, as will presently be described, is arranged to be held against downward movement with the slip segments when the slip segments are moved downwardly during the hanging of the casing, and thus to provide a support against which the distortable packing 11 may be compressed. Despite the fact that the holding ring 10 is held against downward movement with the slip segments, it is supported on the slip segments as distinguished from being in seating engagement with a casing head and supported by direct engagement with the casing head. The slip segments 13 are provided with tapered outer surfaces to fit in the upper portion of the tapered zone 2 of the casing head, and on their inner surfaces are provided with upwardly directed gripping teeth 14 adapted to engage and grip the pipe 9.

Each of the segments 13 is tapped in its upper surface at 15 to receive a cap screw 16 or the like, which passes down through the packing compressing ring 12, the packing 11, and the packing holding ring 10, so as to secure the parts in their assembled relation to each other and so as to force the packing compressing ring 12 to move downwardly with the slip segments when the slip segments move downwardly in hanging the pipe. The packing holding ring 10 and compressing ring 12 provide a packing confining means by which the packing 11 is confined.

Each of the slip segments 13 is formed with a slot extending from its upper surface a portion of the way to its lower extremity, and extending from its outer to its inner surface. These slots indicated at 17 are adapted to receive wedges 18.

The lower end of each of the wedges 18 rests on the upwardly and inwardly sloping lower surface 19 of the corresponding slot 17. Thus, it will be seen that each of the wedges 18 tapers toward its narrower end which is disposed adjacent the pipe 9 and that when forced radially inwardly it will move upwardly. These wedges are of such extent that their upper extremities normally bear against the packing holding ring 10 when the wedges are in their outermost and lowermost positions, and when they are moved inwardly they will likewise move upwardly and force the holding ring 10 away from the slip segments 13.

It will be seen also that each of the wedges 18 is provided with an oversize dowel opening 20 adapted to loosely receive a dowel pin 21 which is threaded at 22 into the packing holding ring 10. These dowels 21 will thus serve to retain the wedges 18 in their respective slots during the placing of the assembly, yet without interfering with their inward and outward movement, the purpose of which will presently appear. These wedges 18, when in their lower and outer positions, project beyond the outer surfaces of the slip segments 13 and themselves provide tapered surfaces adapted to come into initial engagement with the tapered surface 2 in the casing head 1. They thus provide parts projecting outwardly from the outer surfaces of the segments and parts which are yieldable and adapted to yield under pressure toward the regular outer contour of the segments.

The packing holding ring 10 and the packing compressing ring 12 are both made in two parts which complement each other to form these respective annular rings. These parts are split from each other in a longitudinal direction so that each makes up substantially one-half of an annular member. The distortable packing 11 is likewise split but only at one point, so that it consists of one integral flexible or distortable packing member. When the parts are assembled, one-half of the segments 13 are assembled with respect to one of the halves of the packing compressing ring and one of the halves of the packing holding ring, and the other half of the segments are assembled with respect to the other half of the packing compressing ring and the other half of the packing holding ring. The annular distortable packing is so arranged that its one split portion registers or nearly registers with one of the divisions between the packing compressing ring parts and the packing holding ring parts, whereas this annular distortable packing bridges the other split or division between the packing compressing ring parts and the packing holding ring parts. It will be seen that when the parts are secured together as by the cap screws 16, the two segmental halves of the assembly will be joined together only at one side and only by the distortable packing which bridges the split between them. This distortable packing being relatively easy to flex as compared with the other parts of the assembly, may be made to serve as a hinge so that the two parts of the assembly may be moved away from each other and placed around a pipe as illustrated in Figure 4.

It will be appreciated that the cap screws 16 are not tightened sufficiently to expand the distortable packing 11 but are merely for the purpose of holding the parts in assembled relation while they are being put in position in the well and for the additional purpose of connecting the slip segments 13 with the packing compressing ring 12 and causing the packing compressing ring 12 to move with the slip segments 13 for the purpose presently to be more fully explained.

For the purpose of insuring proper guiding and alignment of the assembly while it is being dropped through blowout preventers or the like and during its handling prior to setting, there is provided a setting guide made up of two segmental parts 23 secured together at their opposite extremities by means of bolts 24 or the like. A set screw 25 may be provided whereby this setting guide may be secured to the pipe at any desired position when for any reason it is desired to do this. The segmental parts 23 are provided with downturned lips 23a which are well adapted for use in handling the assembly.

The setting guide may be secured to the assembly by means of cap screws 26 which pass through the flange 27 of the setting guide and are threaded into the upper packing gland ring herein referred to as packing compressing ring. It will be seen that the tapped opening into which the cap screws 26 are engaged in the packing holding gland ring 12 correspond to the openings 22 into which the dowel pins 21 are engaged in the packing holding gland ring 10.

In explaining the operation of this invention, it will be assumed that the pipe 9 is an inner casing which has been run into a well through blowout preventers and other control equipment, and has reached the position where it is desired that it be hung and sealed. It will further be assumed that the well is in such condition that it is not desired that the space betwen the casing and casing head be left open for any substantial length of time because of the danger of a blowout.

While the pipe 9 is being held in suspension by the hoisting apparatus employed in running the pipe, the assembly constructed in accordance with this invention as above described and with the setting guide 23 in place, will be placed about an intermediate portion of the pipe above the blowout preventers in the manner illustrated in Figure 2, which does not necessitate placing it over the end of the pipe. Bolts 24 are then put in place and tightened to secure the assembly around the pipe. The blowout preventers will then be opened so as to permit this assembly to pass down along the pipe and land in the casing head as illustrated in Figure 1. It will be seen that when the parts are in the position illustrated in Figure 1, the packing holding ring or gland 10 will be supported on the upper surfaces of the wedges 18 and restrained thereby against downward movement. Also, the yieldable parts provided by the outer surfaces of the wedges 18 will have come in contact with the tapered zone 2 of the casing head and will have forced the teeth 14 of the segments 13 into contact with the pipe 9.

The weight of the pipe 9 will then be eased off from the hoisting equipment and as this weight is taken on the slip segments 13, these segments will begin to move downwardly, first biting into the pipe with the teeth 14, and then forcing the yieldable parts provided by the wedges 18 to move inwardly toward the regular outer contour of the slip segments. During this downward movement also the segments 13, through the connection provided by the cap screws 16, will move the packing compressing ring 12 downwardly with the segments and compress the packing in a longitudinal direction causing it to expand laterally into sealing engagement with both the casing head 1 and the pipe 9. While the packing holding ring 10 may during this downward movement of the slip segments have some longitudinal movement, it will be restrained by the wedging action of the wedges 18 from moving downwardly with or as fast as the slip segments 13. Thus, the gland rings provided by the packing holding ring 10 and the packing compressing ring 12 will be forced closer to each other to compress the packing 11 longitudinally and cause it to expand laterally into the sealing engagement referred to.

It will be seen that the amount of compression of the packing will be limited by the fact that as soon as the projecting portions of the wedges 18 have moved inwardly to the regular contour of the segments 13, the downward movement of the segments will be halted and that any additional weight of the pipe which is brought to rest on the segments will be transmitted directly by the segments to the casing head 1 and will not be imposed upon the packing 11. Thus, the downward movement of the segments permitted by the yielding of the yieldable wedges 18 determines the degree to which the packing 11 will be compressed and the amount of weight to be placed on this packing.

After the device has been set in the manner just described, it will be appreciated that not only is the pipe hung, but that the space between the pipe and the casing head will be completely sealed off. Thereupon, the control equipment may be removed from the well without danger of blowout through the annular space and the well may then be completed in the usual manner. Of course, the first step in such completion will be to remove the setting guide provided by the segments 23, this being accomplished simply by removing the cap screws 26 and lifting it off, its release from the pipe 9 being accomplished by removal of the bolts 24.

It is noteworthy that if after the casing has been hung and the seal formed in the manner above described, but even before the blowout preventers and other equipment have been removed from the casing head, it be found that the casing is hung at too low a position, the casing may be raised and the mere raising of the casing will cause the raising of the segments 13, permitting outward movement of the wedges 18 and the contraction of the packing 11 so that all the parts will be in their original position and ready for a repetition of exactly the same action in re-hanging the casing at a different level.

It will further be appreciated that if after the setting guide 23 has been removed, it be desired to still further tighten the packing 11, this can be accomplished by means of tightening up upon the cap screws 16 which will thereupon be exposed.

It will be apparent that various modifications may be made in the device as described without departing from the spirit or scope of this invention as defined in the appended claims.

The invention having been described, what is claimed is:

1. A pipe hanger and seal assembly comprising a packing holding ring, an annular distortable packing thereon, a packing compressing ring confining the opposite side of said packing from said holding ring, a ring comprising a plurality of slip segments with pipe engaging portions and having parts in engagement with said compressing ring to move said compressing ring axially with said segments, and yieldable parts carried by said slip segments and initially projecting from the outer surfaces thereof and movable under pressure with respect to said segments toward conformity with the regular outer contours of said segments, and a force transmitting connection between said yieldable parts and said holding ring, said movement of said yieldable parts moving said holding ring toward the compressing ring.

2. A pipe hanger and seal assembly comprising a packing holding ring having a part adapted to be supported against downward movement, an annular distortable packing thereon, a packing compressing ring confining the opposite side of said packing from said holding ring, a ring of slip segments having inner pipe engaging parts and outer seating parts, and yieldable parts carried by said slip segments and initially projecting from the outer seating surfaces thereof to force said pipe engaging parts to engage a pipe or the like and movable under pressure with respect to said segments toward conformity with the regu-

7 lar outer contours of said segments to permit said segments to move downward, said segments being disposed below said rings and packing, and substantially rigid tension members connecting said segments through said holding ring and said packing to the compressing ring to move said compressing ring downwardly with said segments while downward movement of said holding ring is opposed.

3. A pipe hanger and seal assembly comprising a packing holding ring having a part adapted to be supported against downward movement, an annular distortable packing thereon, a packing compressing ring confining the opposite side of said packing from said holding ring, a ring of slip segments having inner pipe engaging parts and outer seating parts, yieldable parts carried by said slip segments and initially projecting from the outer seating surfaces thereof to force said pipe engaging parts to engage a pipe or the like and movable under pressure with respect to said segments toward conformity with the regular outer contours of said segments to permit said segments to move downward, said segments being disposed below said rings and packing, and adjustable length substantially rigid tension members connecting said segments through said holding ring and said packing to the compressing ring to move said compressing ring downwardly with said segments while downward movement of said holding ring is opposed.

4. A pipe hanger and seal assembly comprising a packing holding ring, an annular distortable packing thereon, a packing compressing ring confining the opposite side of said packing from said holding ring, a ring of slip segments, yieldable parts carried by said slip segments and initially projecting from the outer surfaces thereof and movable under pressure with respect to said segments toward conformity with the regular outer contours of said segments, said segments being disposed below said rings and packing, and adjustable length substantially rigid tension members connecting said segments through said holding ring and said packing to the compressing ring, and means actuated by said yieldable parts and operative upon yielding of said parts for urging away from said segments the holding ring to prevent it from moving downwardly with the segments and compressing ring.

5. A pipe hanger and seal assembly comprising a packing holding ring, an annular distortable packing thereon, a packing compressing ring in engagement with the opposite side of said packing from said holding ring, a ring comprising a plurality of slip segments with pipe engaging portions and yieldable parts carried by said slip segments and initially projecting from the outer surfaces thereof and movable under pressure with respect to said segments toward conformity with the regular outer contours of said segments, a force transmitting connection between said yieldable parts and said holding ring, said movement of said yieldable parts acting through said connection to move said holding ring toward the compressing ring, and substantially rigid connections between said segments and said compressing ring to move said compressing ring axially with said segments.

6. A pipe hanger and seal assembly comprising a packing holding ring having a part adapted to be supported against downward movement, an annular distortable packing thereon, a packing compressing ring in engagement with the opposite side of said packing from said holding ring, a ring comprising a plurality of slip segments having pipe engaging portions and having parts in engagement with said compressing ring to move said compressing ring axially toward the holding ring with said segments as the latter move to pipe engaging position, and yieldable parts carried by said slip segments and initially projecting from the outer surfaces thereof to cause engagement of said pipe engaging portions before said segments move downwardly to seated position and movable under pressure with respect to said segments toward conformity with the regular outer contours of said segments to permit the segments to seat, the engagement between said segments and compressing ring being adjustable.

7. A pipe hanger and seal assembly comprising a packing holding ring having a part adapted to be supported against downward movement, an annular distortable packing thereon, a packing compressing ring engaging the opposite side of said packing from said holding ring, a ring comprising a plurality of slip segments having portions engageable with a pipe and having parts in engagement with said compressing ring to move said compressing ring downwardly with said segments while the holding ring is supported against downward movement, yieldable parts carried by said slip segments and initially projecting from the outer surfaces thereof to cause engagement of said pipe engaging portions before said segments move downwardly to seated position and movable under pressure with respect to said segments toward conformity with the regular outer contours of said segments to permit the segments to seat, and means having actuating parts exposed axially above the assembly for adjusting the spacing between said segments and said compressing ring.

8. A pipe hanger and seal assembly comprising a packing holding ring, an annular packing thereon, a packing compressing ring engaging the opposite side of said packing from said holding ring, a ring comprising a plurality of slip segments with pipe engaging portions and having parts in engagement with said compressing ring to move said compressing ring axially with said segments, and yieldable parts carried by said slip segments and initially projecting from the outer surfaces thereof and movable under pressure with respect to said segments toward conformity with the regular outer contours of said segments, said yieldable parts including bearing surfaces engaging said holding ring and being moved toward said compressing ring upon movement of said yieldable parts.

9. A pipe hanger and seal assembly comprising a pair of gland rings, an annular distortable packing having its ends confined between said rings, a ring of slip segments secured to and adjacent said rings, each of said segments having an outwardly projecting yieldable part adapted to engage a slip bowl initially and then yield under pressure with respect to said segments to permit said segments to move further into such bowl after such initial engagement, and each segment having also a relatively unyielding outer part adapted to engage a slip bowl after a predetermined amount of such further movement and limit the same, and means for transmitting movement of said segments after such initial engagement to one of said rings to move it toward the other ring and compress the packing, and means carried by the segments for engaging the other of said rings to hold it against movement with said segments and cause it to move toward the first ring during such further movement of the segments.

10. A pipe hanger and seal assembly comprising a pair of gland rings, an annular distortable packing having its ends confined between said rings, a ring of slip segments secured to and depending from said rings, each of said segments having an outwardly projecting yieldable part adapted to engage a slip bowl initially and then yield under pressure with respect to said segments to permit such segments to move further into such bowl after such initial engagement, and each segment having also a relatively unyieldable outer part adapted to engage a slip bowl after a predetermined amount of such further movement and limit the same, means for transmitting movement of said segments after such initial engagement to one of said rings to move it toward the other ring and compress the packing, said means comprising a plurality of relatively unyielding tension members extending through the lower of said gland rings and said annular packing and secured to the upper of said gland rings, and means for transmitting movement of said yieldable parts after such initial engagement to the other of said rings to move it toward the first ring and compress the packing.

11. A pipe hanger and seal assembly comprising a packing holding ring, and annular distortable packing thereon, a packing compressing ring confining the opposite side of said packing from said holding ring, a ring of slip segments having parts in engagement with said compressing ring to move said compressing ring axially with said slips, and yieldable parts carried by said slip segments and initially projecting from the outer surfaces thereof and movable under pressure with respect to said segments toward conformity with the regular outer contour of said segments, said yieldable parts comprising wedges having a surface bearing on a wedge surface carried by said segments, the latter wedge surface being inclined inwardly toward said holding ring, said parts wedging against said holding ring as said segments move to prevent said holding ring from moving with said segments.

12. A pipe hanger and seal assembly comprising a packing holding ring, an annular distortable packing thereon, a packing compressing ring confining the opposite side of said packing from said holding ring, a ring of slip segments on the side of said holding ring opposite said compressing ring and having parts in engagement with said compressing ring to move said compressing ring axially with said slips, and yieldable parts carried by said slip segments and initially projecting from the outer surfaces thereof and movable under pressure with respect to said segments toward conformity with the regular outer contours of said segments, said segments having slots therein extending downwardly from their upper extremities and said yieldable parts comprising wedges mounted in said slots and engaging said holding ring and of such dimensions that when their radially outward parts are flush with the regular outer contours of said segments they will project above said segments and hold said holding ring away from said segments.

13. A pipe hanger and seal assembly comprising a packing holding ring, an annular distortable packing thereon, a packing compressing ring confining the opposite side of said packing from said holding ring, a ring of slip segments on the side of said holding ring opposite said compressing ring and having parts in engagement with said compressing ring to move said compressing ring axially with said slips, and yieldable parts carried by said slip segments and initially projecting from the outer surfaces thereof and movable under pressure inwardly with respect to said segments toward conformity with the regular outer contours of said segments, said yieldable parts comprising wedges disposed between and bearing upon said segments and said holding ring and having their narrower portions directed radially inwardly whereby when said wedges are forced radially inwardly they will serve to increase the distance between said holding ring and said segments and prevent the holding ring from moving with said segments and distort said packing.

14. A pipe hanger and seal assembly comprising a packing holding ring, an annular distortable packing thereon, a packing compressing ring confining the opposite side of said packing from said holding ring, a ring of slip segments on the side of said holding ring opposite said compressing ring and having parts in engagement with said compressing ring to move said compressing ring axially with said slips, and yieldable parts carried by said slip segments and initially projecting from the outer surfaces thereof and movable under pressure inwardly with respect to said segments toward conformity with the regular outer contours of said segments, said yieldable parts comprising wedges inserted between and bearing upon said segments and said holding ring with their narrower portions directed radially inwardly whereby when said segments are forced radially inwardly they will serve to force said holding ring away from said segments and prevent said holding ring from moving with said segments and distort said packing, said wedges each having an oversized dowel opening therein extending from its uppermost surface into the body of the wedge, and a dowel pin carried by said holding ring fitting loosely in each of said dowel openings so as to prevent said wedges from being displaced but permitting them to move radially inwardly and outwardly to perform their intended function.

15. A pipe hanger and seal assembly comprising a plurality of slip segments, pipe engaging teeth on the inner face of said slip segments, elements yieldable with respect to said segments and extending radially outwardly from said slip segments and adapted to contact a slip bowl, a packing compressing ring carried by said slip segments, an annular distortable packing ring against said compressing ring, and a force transmitting means between said yieldable elements and the side of said packing ring opposite said compressing ring and adapted to transmit the force on said yieldable elements due to the pipe load to said packing ring, whereby said packing ring is forced into sealing engagement with a pipe passing therethrough.

16. A pipe hanger and seal assembly comprising a plurality of slip segments, pipe engaging teeth on the inner face of said slip segments, movable elements extending radially outwardly from said slip segments and adapted to contact a slip bowl, packing confining means carried by said slip segments for confining a packing against endwise flow, an annular distortable packing confined by said packing confining means, and a force transmitting means between said movable elements and said packing adapted to transmit the force on said movable elements due to the pipe load to said packing, whereby said packing is forced to expand radially into sealing engagement with a pipe passing therethrough.

17. A pipe hanger and seal assembly comprising a packing holding ring, an annular distortable packing thereon, a packing compressing ring confining the opposite side of said holding ring, a ring of slip segments having parts in engagement with said compressing ring to move said compressing ring axially toward said packing with movement of said segments, and yieldable parts carried by such slip segments and initially projecting from the outer surfaces thereof and movable under pressure toward conformity with the regular outer contours of said segments, the yieldable parts having a force transmitting connection with said holding ring causing movement of the latter relative to the segments upon movement of the yieldable parts toward conformity with said contour of said segments.

References Cited in the file of this patent

UNITED STATES PATENTS

| Number | Name | Date |
| --- | --- | --- |
| 1,650,074 | Kammerdiner | Nov. 22, 1927 |
| 1,923,283 | Stokes | Aug. 22, 1933 |
| 2,073,890 | Tschappat | Mar. 16, 1937 |
| 2,118,094 | McDonough et al. | May 24, 1938 |
| 2,173,037 | Dailey | Sept. 12, 1939 |
| 2,194,265 | Abercrombie | Mar. 19, 1940 |
| 2,237,680 | Mark | Apr. 8, 1941 |
| 2,312,487 | Roach et al. | Mar. 2, 1943 |
| 2,493,556 | Stone | Jan. 3, 1950 |
| 2,532,662 | Eckel | Dec. 5, 1950 |
| 2,553,838 | Allen et al. | May 22, 1951 |
| 2,600,257 | Neilon | June 10, 1952 |
| 2,610,689 | Eckel | Sept. 16, 1952 |
| 2,620,880 | Mueller et al. | Dec. 9, 1952 |